United States Patent
Slovin

[11] Patent Number: 6,144,855
[45] Date of Patent: Nov. 7, 2000

[54] METHODS AND APPARATUS PERTAINING TO ROAMING OF STATIONS BETWEEN ACCESS POINTS IN WIRELESS AND OTHER NETWORKS

[75] Inventor: Zvi Slovin, Rehovot, Israel

[73] Assignee: Marconi Communications Israel Ltd., Northern Industrial Zone, Israel

[21] Appl. No.: 08/889,028

[22] Filed: Jul. 7, 1997

[30] Foreign Application Priority Data

Jul. 5, 1996 [IL] Israel ......................................... 118806

[51] Int. Cl.[7] ....................................................... H04B 1/00
[52] U.S. Cl. ......................... 455/432; 455/430; 455/452; 455/510
[58] Field of Search ..................................... 455/432, 430, 455/452, 510, 524; 370/328, 338, 252, 331, 332, 401, 340, 341, 343, 344

[56] References Cited

U.S. PATENT DOCUMENTS

| | | | |
|---|---|---|---|
| 4,670,899 | 6/1987 | Brody et al. | 379/60 |
| 5,583,869 | 12/1996 | Grube et al. | 455/452 |
| 5,737,328 | 4/1998 | Norman et al. | 455/33.2 |
| 5,754,959 | 5/1998 | Ueno et al. | 455/432 |
| 5,790,952 | 8/1998 | Seazholtz et al. | 455/432 |

*Primary Examiner*—Daniel S. Hunter
*Assistant Examiner*—Thuan T. Nguyen
*Attorney, Agent, or Firm*—Darby & Darby

[57] ABSTRACT

This invention discloses a network system including a plurality of access points, a multiplicity of network stations wherein for each station, a ratio between available channel fraction and station channel demand is defined, and wherein each of the multiplicity of stations roams between the plurality of access points so as to equalize the ratios over at least a subset of the multiplicity of stations

11 Claims, 4 Drawing Sheets

METHODS AND APPARATUS PERTAINING TO ROAMING OF STATIONS BETWEEN ACCESS POINTS IN WIRELESS AND OTHER NETWORKS

FIELD OF THE INVENTION

The present invention relates to apparatus and methods for wireless network communication.

BACKGROUND OF THE INVENTION

Wireless networks, based on infra-red or radio technology, are well known and are described in the following documents:

Wireless Access and the Local Telephone Network (Telecommunications Library), George Calhoun;

Network Remote Access and Mobile Computing: Implementing Effective Remote Access to Networks and E-mail (LAN networking library), Melanie McMullen;

PCMCIA Handbook: Exploiting the Mobile Computing Network, book and disk, Dana L. Beatty, Steve Kipsisz;

Mobile Data Communications Systems (The Artech House Mobile Communications), Peter Wong, David Britland;

The Wireless Data Handbook, James, F. Derose;

Wireless Data Networking, (Telecommunications Library), Nathan J. Muller, Linda Lee Tyke;

Wireless Information Networks; Architecture, Resource Management and Mobile Data, (Kluwer international series in engineering and computer sciences, Jack M. Holtzman; and Data Over Radio, Varrell The disclosures of all publications mentioned in the specification and of the publications cited therein are hereby incorporated by reference.

SUMMARY OF THE INVENTION

The present invention seeks to provide improved apparatus and methods for wireless network communication for any suitable type of network such as LANs (local area networks), WANs (wide area networks) and MANs (metropolitan area networks).

There is thus provided, in accordance with a preferred embodiment of the present invention, a network system including a plurality of access points, a multiplicity of network stations wherein for each station, a ratio between available channel fraction and station channel demand is defined, and wherein each of the multiplicity of stations roams between the plurality of access points so as to equalize the ratios over at least a subset of the multiplicity of stations.

Further in accordance with a preferred embodiment of the present invention, each of the multiplicity of stations includes a wireless station including a frequency table memory including a set of frequency tables each having an ID, and a table of information regarding the plurality of access points including at least some of the following information for each of at least some of the plurality of access points:

access point's ID including the access point's frequency table ID and a time-stamped entry of the access point's frequency table, access point's quality of service, time-stamped, and access point's radio signal strength intensity(RSSI) level, time-stamped.

Further in accordance with a preferred embodiment of the present invention, each wireless station includes an access point learner which is operative to maintain the table of information.

Still further in accordance with a preferred embodiment of the present invention, the access point learner operates in background.

Additionally in accordance with a preferred embodiment of the present invention, each of the access points includes a quality of service computation unit operative to compute and broadcast the access point's quality of service.

Further in accordance with a preferred embodiment of the present invention, each station also includes a roam-decision maker which decides whether or not to roam based on the quality of the station's radio environment and on extent of access of the station to channel.

Still further in accordance with a preferred embodiment of the present invention, the environment quality is based at least partly on the proportion of messages which required retransmission in a sliding time window of predetermined size.

Still further in accordance with a preferred embodiment of the present invention, the channel access extent is based at least partly on packet delay information.

Further in accordance with a preferred embodiment of the present invention, the roam-decision maker makes a decision whether or not to roam at least partly on the basis of the RSSI levels and qualities of service received from the access point as stored in the table of information within its station.

Further in accordance with a preferred embodiment of the present invention, the system also includes an access point selector operative to select an access point to which to roam.

Also provided, in accordance with another preferred embodiment of the present invention, is a wireless network system including a plurality of access points operating within a frequency spectrum in accordance with a frequency hopping schedule, and a multiplicity of wireless stations each including a newcomer processing unit operative to receive at a predetermined sequence of at least one frequencies from among the frequency spectrum until an individual access point with which the station is able to be associated is detected.

Further in accordance with a preferred embodiment of the present invention, the sequence is selected to homogeneously span the frequency spectrum.

Also provided, in accordance with another preferred embodiment of the present invention, is a wireless network system using a radio link to connect a population of wireless stations, wherein the radio link and the population of wireless stations define a network, the system including a plurality of access points each providing a quality of service, and a multiplicity of wireless stations operative to communicate via the network wherein each of the plurality of wireless stations is operative, only during idle times, to periodically evaluate the qualities of service of at least some of the access points.

Further in accordance with a preferred embodiment of the present invention, each of the multiplicity of wireless stations is operative to periodically evaluate the qualities of service of at least some of the access points without occupying the radio link.

Also provided, in accordance with still another preferred embodiment of the present invention, is a wireless network system using a radio link to connect a population of wireless stations, wherein the radio link and the population of wireless stations define a network, the system including a plurality of access points each providing a quality of service, and a multiplicity of wireless stations each operative to communicate via the network and to periodically evaluate the qualities of service of at least some of the access points without occupying the radio like.

Further provided, in accordance with yet another preferred embodiment of the present invention, is a wireless network system using a radio link to connect a population of wireless stations, wherein the radio link and the population of wireless stations define a network, the system including a plurality of access points, and a multiplicity of wireless stations each operative to communicate via an individual one of the plurality of access points, thereby to define, for each individual access point, a quality of service thereof provided to the wireless stations, wherein each of the plurality of access points includes a quality of service broadcasting unit operative to compute and periodically broadcast an indication of the quality of service which that access point is providing.

Further in accordance with a preferred embodiment of the present invention, the indication of the quality of service is at least partially based on a proportion of transmitted information which needs to be retransmitted.

Still further in accordance with a preferred embodiment of the present invention, the indication of the quality of service is at least partially based on an estimate of the number of stations which are expected to become active within a predetermined sliding time window.

Further in accordance with a preferred embodiment of the present invention, the indication of the quality of service is at least partially based on the product of a proportion of transmitted information which needs to be retransmitted and an estimate of the number of stations which are expected to become active within a predetermined sliding time window.

Also provided, in accordance with another preferred embodiment of the present invention, is a wireless network system including a plurality of access points each operating in accordance with a frequency table, and a multiplicity of wireless stations served by the plurality of access points and operative to roam between the plurality of access points, each of the wireless station including a frequency memory operative to store a frequency at which an individual access point is operating, a locking frequency computation unit operative to compute a locking frequency at which the individual access point will soon be operating, based on information from the frequency memory, and a lock-in unit operative to lock the wireless station into the locking frequency.

Further in accordance with a preferred embodiment of the present invention, the frequency memory is updated during idle times.

Also provided, in accordance with another preferred embodiment of the present invention, is a network roaming method including defining, for each of a multiplicity of network stations, a ratio between available channel fraction and station channel demand, and causing each of the multiplicity of stations to roam between a plurality of access points so as to equalize the ratios over at least a subset of the multiplicity of stations.

Further provided, in accordance with another preferred embodiment of the present invention, is a wireless networking method including operating a plurality of access points within a frequency spectrum in accordance with a frequency hopping schedule, and causing each station from among a multiplicity of wireless stations to receive at a predetermined sequence of at least one frequencies from among the frequency spectrum until an individual access point with which the station is able to be associated is detected.

Additionally provided, in accordance with another preferred embodiment of the present invention, is a wireless networking method using a radio link to connect a population of wireless stations, wherein the radio link and the population of wireless stations define a network, the method including providing a multiplicity of wireless stations operative to communicate via the network, and, only during idle times, periodically evaluating, at the wireless stations, the qualities of service of at least some of the access points.

Further provided, in accordance with yet another preferred embodiment of the present invention, is a wireless networking method using a radio link to connect a population of wireless stations, wherein the radio link and the population of wireless stations define a network, the method including providing a multiplicity of wireless stations each operative to communicate via the network, and periodically evaluating, at each of the stations, the qualities of service of at least some of a plurality of access points without occupying the radio link.

Still further provided, in accordance with another preferred embodiment of the present invention, is a wireless network method using a radio link to connect a population of wireless stations, wherein the radio link and the population of wireless stations define a network, the method including providing a multiplicity of wireless stations each operative to communicate via an individual one of a plurality of access points, and at each of the plurality of access points, computing and periodically broadcasting an indication of the quality of service which that access point is providing.

Also provided, in accordance with yet another preferred embodiment of the present invention, is a wireless networking method including providing a multiplicity of wireless stations served by a plurality of access points each operating in accordance with a frequency table and operative to roam between the plurality of access points, including storing a frequency at which an individual access point is operating, and computing a locking frequency at which the individual access point will soon be operating, based on information from the frequency memory, and locking a wireless station into the locking frequency.

BRIEF DESCRIPTION OF THE DRAWINGS

The present invention will be understood and appreciated from the following detailed description, taken in conjunction with the drawings in which.

Figure 1:
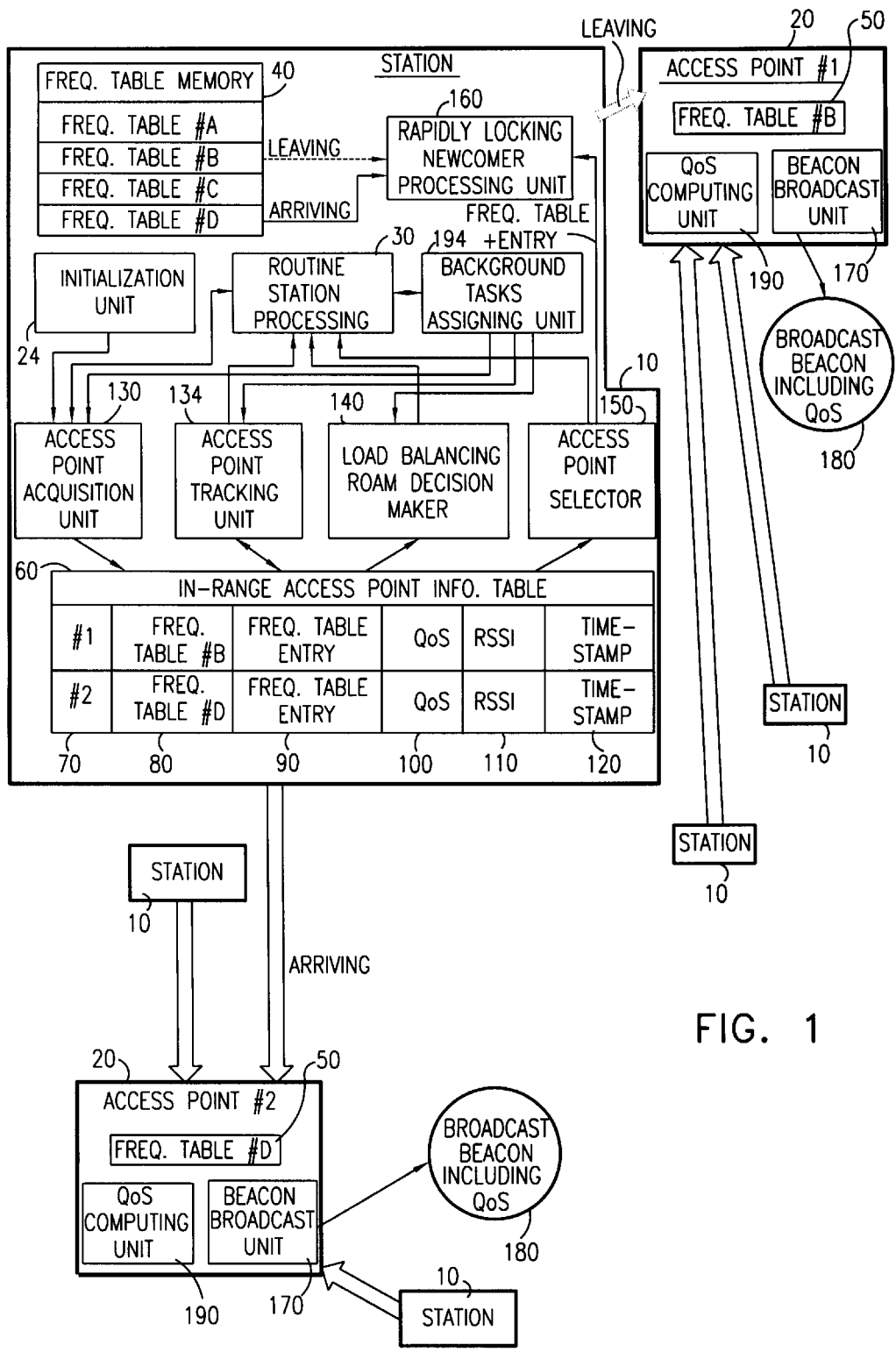
FIG. 1 is a simplified functional block diagram of a wireless network system constructed and operative in accordance with a preferred embodiment of the present invention.

Attached herewith is the following appendix which aids in the understanding and appreciation of one preferred embodiment of the invention shown and described herein:

Appendix A is a computer listing of a preferred software implementation of the system of FIG. 1, in pseudocode.

DETAILED DESCRIPTION OF PREFERRED EMBODIMENTS

A portion of the disclosure of this patent document contains material which is subject to copyright protection.

The copyright owner has no objection to the facsimile reproduction by anyone of the patent document or the patent disclosure, as it appears in the Patent and Trademark Office patent file or records, but otherwise reserves all copyright rights whatsoever.

Reference is now made to FIG. 1 which is a simplified functional block diagram of a wireless network system constructed and operative in accordance with a preferred embodiment of the present invention. The system of FIG. 1 includes a multiplicity of stations 10 which are serviced by a plurality of access points 20. For simplicity, only 5 stations and 2 access points are illustrated. Each station 10 includes a routine station processing unit 30 which is operative to perform all conventional operations performed by a station. Each station 10 also includes a frequency table memory 40 storing a number of frequency tables each of which may be employed by one of the access points. Each access point 20 stores the frequency table 50 which it employs.

The station 10 also includes an in-range access point information table 60 which preferably includes information regarding at least each access point which is currently in range for that station, and each station is preferably operative to initially and periodically update the table entries of access points which are in range as explained in detail below with reference to FIG. 5.

The information regarding each in-range access point preferably includes some or all of the following information items:

a. access point's ID 70 including the access point's frequency table ID 80 and a time-stamped entry 90 of the selected access point's frequency table.

b. access point's quality of service 100, time-stamped; and c. access point's radio signal strength intensity (RSSI) level 110, time-stamped.

d. The time-stamp is referenced 120 in FIG. 1. The time stamp preferably comprises the current entry of the frequency table of the access point which is currently servicing the station.

The access point information table 60 is initially and periodically updated by an access point acquisition unit 130 in cooperation with an access point tracking unit 134. The operation of access point acquisition unit 130 is described in detail below with reference to FIGS. 3 and 5. The operation of access point tracking unit 134 is described in detail below with reference to FIG. 6.

According to a preferred embodiment of the present invention, each station includes a load balancing roam decision maker 140 which is operative to periodically make a decision as to whether or not to roam from a current access point to a different access point.

Once a decision has been made to roam, the roam decision maker activates an access point selector 150 which is operative to select an individual access point 20 from among the plurality of access points to which to roam. It is generally possible that no access point 20 will be found which is better, as described hereinbelow, than the access point currently serving the station in which case the station typically does not roam.

If a better access point is found by access point selector 150, the selector activates newcomer processing unit 160 and supplies the frequency table of the selected access point and the current entry therewithin to newcomer processing unit 160. The newcomer processing unit 160 is operative to rapidly lock onto the frequency of the selected access point 20 because it is supplied with the access point's frequency table and current entry and therefore knows essentially instantaneously the current frequency onto which it is to lock.

If no better access point is found by access point selector 150, the routine station processing unit 30 becomes active.

Each access point 20 includes a beacon broadcasting unit 170 which is operative to broadcast a beacon 180, preferably periodically The beacon typically comprises the following information:

a. The ID of the access point which typically includes the frequency table employed by the access point and the current entry to that frequency table.

b. Information regarding the quality of service. For example, the quality of service information may simply comprise the number of stations associated with that access point, since, generally speaking, the more stations associated with the access point, the worse the quality of service because each of the associated stations receives a smaller channel fraction.

Alternatively or in addition, the quality of service may comprise the number of stations from among those associated with that access point which were active within a predetermined sliding time window.

Preferably, the quality of service information includes a parameter QoS which increases as the quality of service decreases and which is computed by a QoS computation unit 190 as follows:

If the access point's state change, computed over, say, the last three hops, does not rise above a critical threshold for acceptable state change, then:

$$QoS=\min[\pi \times TOTAL/OK \times (U_A+(U_R-U_A+1)/4, 255],$$

where:

TOTAL=the number of packet fragments transmitted within a certain cell within a certain sliding time-window, including re-transmissions. A cell may, for example, comprise all stations served by an individual access point, or a defined subset thereof;

OK=the number of packet fragments transmitted within that cell within the sliding time-window, not including re-transmissions;

TOTAL/OK=overhead cell traffic ratio $U_A$=the number of active stations. An active station may, for example, be defined as a station which transmitted at least one packet within a sliding time-window which may, for example, be the same time-window used to define TOTAL and OK.

$U_R$=the total number of stations associated with the access point, active and otherwise.

Otherwise, QoS=worst.

Generally, it is the case that, for each application, a sliding time window and migration factor can be found such that the proportion of non-active stations belonging to a particular access point which are expected to become active within each such sliding time window is the migration factor. For example, in Ethernet FTP (file transfer protocol) applications, it may be found empirically that within a time-window of 5 seconds, ¼ of the non-active stations currently belonging to a particular access point $(U_R-U_A)$ may statistically be expected to become active.

The process by which stations are learned typically includes two functional procedures which are performed by units 130 and 134 respectively. The first functional learning procedure is an acquisition procedure whereby new access points not previously encountered are learned. The first learning procedure is performed by unit 130 and is typically performed during initialization of the system, upon activation by initialization unit 24 of FIG. 1. The first leaning procedure is also typically performed periodically, as a background task, in order to allow access points which are newly encountered due, for example, to relative motion of the stations.

The second learning procedure, performed by unit 134, is typically not performed during initialization but is performed periodically, as a background task. In the second learning procedure, information regarding already learned access points is updated to reflect changing circumstances.

A background task assigning unit 194 is operative to route the system to the functions of units 130, 134 and 140. Each of these functions is typically performed with a different periodicity. Typically, unit 134 is activated with highest periodicity, unit 140 is activated with medium periodicity, and unit 130 is activated with lowest periodicity. The activation of units 130, 140 and 134 are described in detail below with reference to decision steps 224, 244 and 234, respectively, of FIG. 2.

Figure 2:
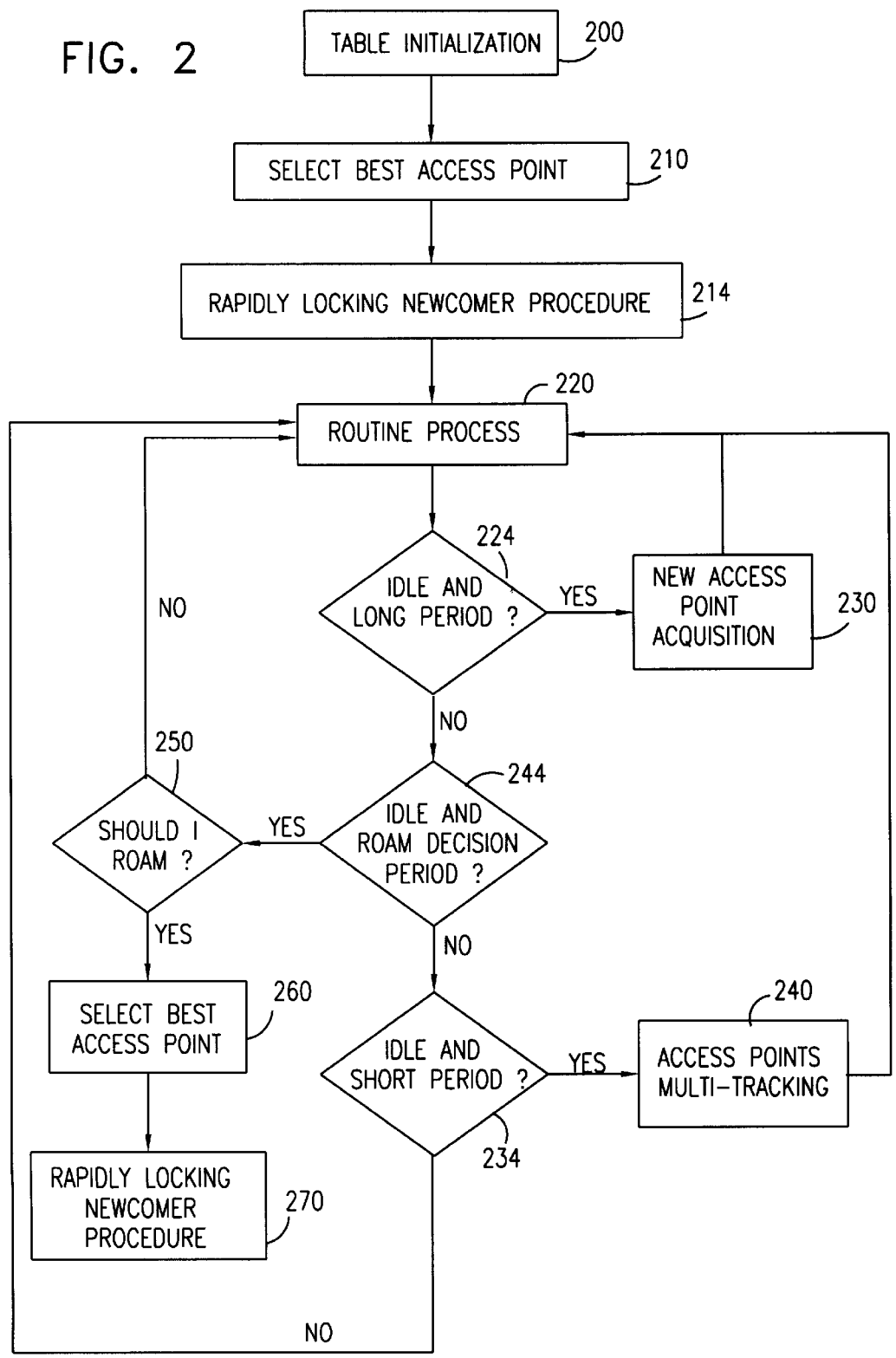
FIG. 2 is a simplified flowchart illustration of a wireless network communication load balancing and roaming method performed by each of the stations of FIG. 1.

FIG. 2 is a simplified flowchart illustration of a wireless network communication load balancing and roaming method performed by each of the stations of FIG. 1. The method of FIG. 2 includes the following steps:

step 200, performed by the access point acquisition unit 130 and described in detail below with reference to FIG. 3;

step 210, performed by the access point selector 150 and described in detail below with reference to FIG. 4;

step 214, performed by the newcomer processing unit 160 and described in detail below with reference to FIG. 4;

step 220, performed conventionally by the routine station processor 30 of FIG. 1;

decision step 224, performed by background task assigning unit 194;

step 230, performed by the access point acquisition unit 130 and described in detail below with reference to FIG. 5;

decision step 244, performed by background task assigning unit 194;

decision step 234, performed by background task assigning unit 194;

step 240, performed by the access point acquisition unit 130 and described in detail below with reference to FIG. 6;

step 250, performed by the load balancing roam decision maker 140;

step 260, which may be identical to step 210 and is also performed by the access point selector 150; and step 270, which may be identical to step 214 and is also performed by the newcomer processing unit 160.

A preferred mode of operation of the method of FIG. 2 is now described:

The in-range access point information table 60 is initialized (step 200). In step 210, the access point selector 150 employs the table to select an access point by which the station will be served, preferably the best access point from among the in-range access points. A suitable definition for "bestness" is described below with reference to the Decision column of the Parameter State-Decision table. Typically, the definition for bestness depends on the reason which is causing the station to roam.

The access point selector 150 preferably supplies the frequency table of the selected access point and the current entry thereof to rapidly locking newcomer processing unit 160. Preferably, in step 214, newcomer processing unit 160 immediately locks onto the frequency corresponding to the current entry rather than loading itself with a particular frequency and waiting until the access point arrives at that frequency.

The station then commences its conventional operations (step 220), i.e. Transmitting and receiving messages via the selected access point and all conventional control operations associated with its transceiving functions, which are all well known in the art.

Preferably, each time the station becomes idle, the background task assigning unit 194 performs decision step 224.

Typically, decision step 224 comprises the following decision: [(No. of hops) mod N=0] AND [FALSE IF TRUE VALUE ALREADY RETURNED WITHIN THIS HOP]. In other words, the decision step returns a true value at most once within each hop. N may, for example, comprise 10× the number of frequencies in the access points spectrums.

Figure 5:
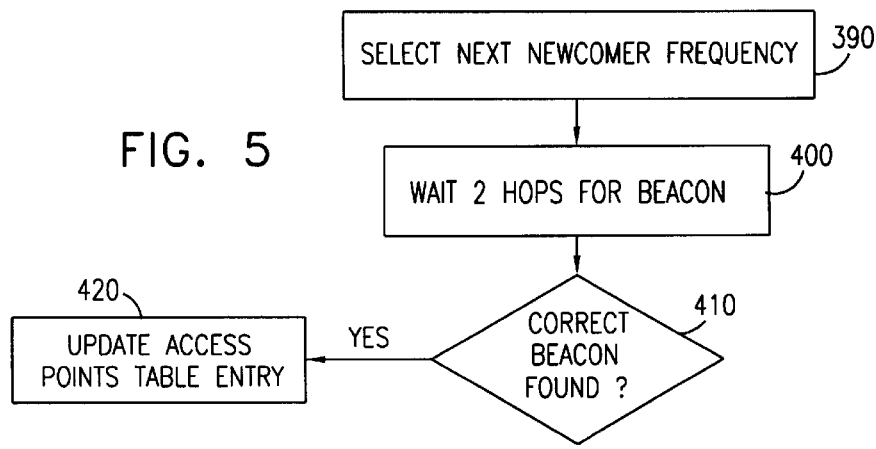
FIG. 5 is a simplified flowchart illustration of a preferred method of searching for new access points suitable for implementing the new access point search step of FIG. 2.

If decision step 224 returns a true value, a new access point is searched for (step 230), using the method of FIG. 5. If the station is still idle when the access point search process 230 has been completed, or if the decision step 224 returns a false value, decision step 244 is performed.

Decision step 244 determines whether or not to perform the "should I roam" decision step 250. Typically, the decision step 250 is performed with a periodicity defined hereinbelow. Preferably, the various stations use different periodicities which, preferably, are randomly assigned thereto. If decision step 244 returns false, step 234 is performed.

Figure 6:
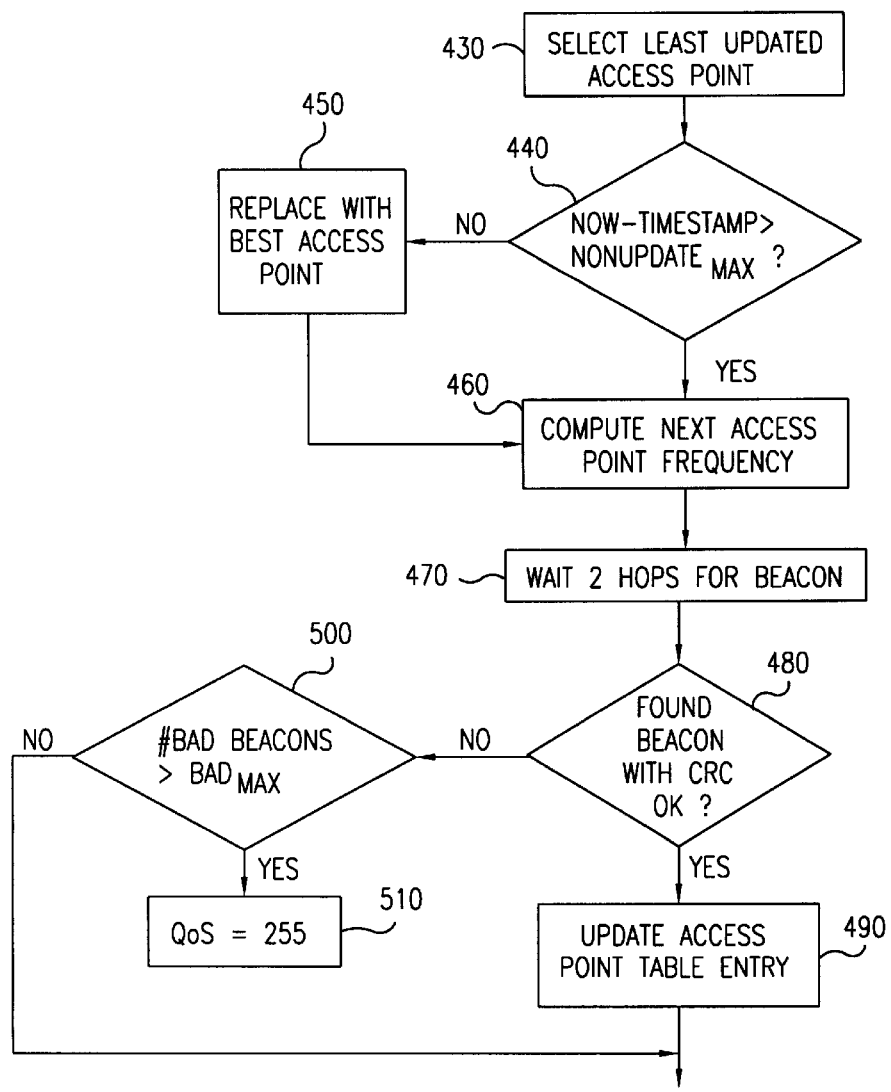
FIG. 6 is a simplified flowchart illustration of the access point update step of FIG. 2.

Decision step 234 compares the amount of time which elapsed since the method of FIG. 6 was last performed, to a threshold value. Decision step 234 may be similar to decision step 224 except that N is approximately ⅒ of the N used for decision step 224. If decision step 234 returns true, the access point information table 60 is updated, using the method of FIG. 6, and subsequently, step 240 is performed.

In step 250, the roam decision maker 140 decides whether or not the station should roam to a new access point. A suitable decision table for the roam decision maker is described below with reference to the Parameter State column of the Parameter State/Decision table.

If the roam decision maker decides that the station should not roam, the station returns to normal operation. If the roam decision maker 140 decides that the station should roam, the access point selector 150 selects a better access point (step 260), if such exists, to which to roam, and the newcomer processing unit 160 locks into that access point (step 270), all as described below with reference to FIG. 4.

Figure 3:
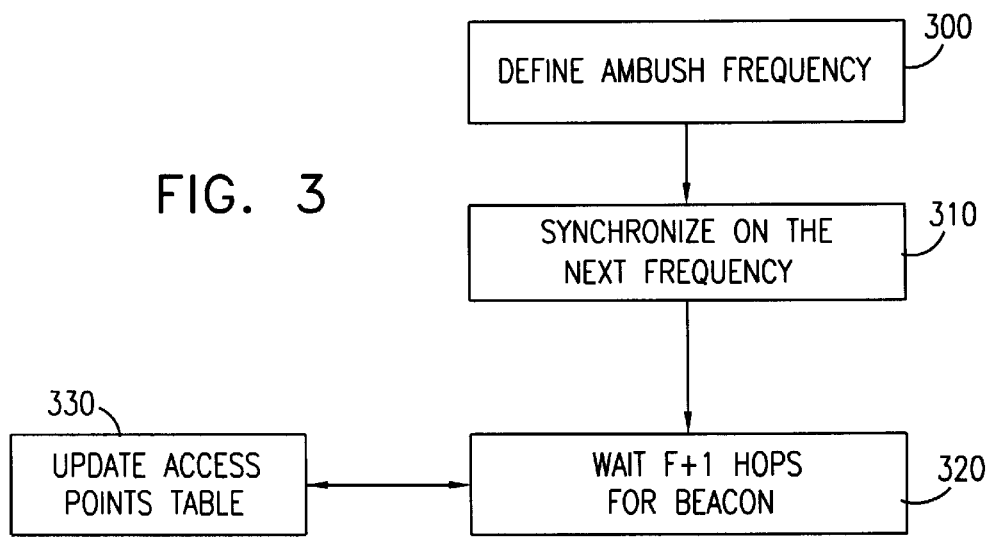
FIG. 3 is a simplified flowchart illustration of a preferred method implementing the table initialization step of FIG. 2.

Reference is now made to FIG. 3 which is a preferred method by which access point acquisition unit 130 performs the access point information table updating step 200 of FIG. 2.

The method of FIG. 3 preferably includes the following steps:

step 300—a sequence of at least one ambush frequencies is defined which will be employed to learn each access point in the vicinity of the station. A suitable recursive definition of ambush frequencies is:

$f_1 = F/N+1)/2$
$f_{n+1} = f_n + F/N$, where:

n=1, 2, . . . , N

F=the number of frequencies in the frequency spectrum

N=the number of spanning frequencies (four, in the present example).

Step 310—Synchronize on the next frequency in the sequence.

Step 320—wait, in Rx state, for beacons, for a period of time which may, for example, be equal to F+1 hops.

Each time a beacon is found, perform step 330 in which the access point information table 60 is updated to reflect the information within the beacon.

Figure 4:
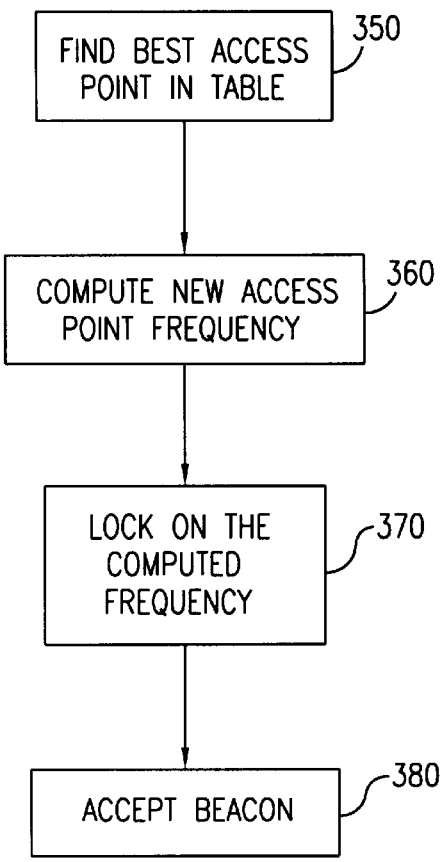
FIG. 4 is a simplified flowchart illustration of a preferred method implementing the best access point synchronization step of FIG. 2.

Reference is now made to FIG. 4 which describes a preferred method by which access point selector 150 selects a "best" access point (step 210 of FIG. 2) and newcomer processing unit 160 locks into the selected access point (step 214).

The method of FIG. 4 preferably includes the following steps:

step 350—The access point information Table 60 is examined in order to identify the currently "best" access point. One access point is better than another if its QoS is higher, all other things being equal, or if its RSSI is higher, again, all other things being equal. To discriminate between two access points, one of which has an RSSI higher than, and a QoS lower than, the other, any suitable trade-off formula may be employed, such as the trade-off formulas appearing in the Parameter State/Decision table described below.

It is appreciated that the trade-off between RSSI and QoS may be application-dependent.

Step 360—The newcomer processing unit 160 computes a lock-in frequency for the selected access point, by computing a suitable "lock-in entry" in the selected access point's frequency table, based on the last-known, time-stamped entry in that frequency table. A preferred formula for this computation is as follows:

lock-in entry=time-stamped entry+current entry of the frequency table of the access point now serving the station−time stamp+1.

In step 370, the newcomer processing unit 160 locks into the frequency corresponding to the above-computed lock-in entry.

In step 380, the newcomer processing unit accepts a beacon from the selected access point which is expected within 2 hops. It is appreciated that the lock-in entry need not be computed as 1 ahead of the current entry but alternatively may be computed as any small number of entries ahead of the current entry.

FIG. 5 describes a preferred method by which access point acquisition unit 130 of FIG. 1 performs a search for new access points (step 230 of FIG. 2).

FIG. 5 preferably comprises the following steps:

STEP 390—An ambush frequency is selected

STEP 400—The station listens for a beacon at the ambush frequency until a beacon is heard or up to a time limit such as the duration of 2 hops;

STEP 410—The beacon is checked to ensure that it has been received correctly and completely; and STEP 420—If the beacon has been received correctly and completely, an appropriate entry is added to the access point table. If an appropriate entry already exists, this entry is updated to reflect the contents of the beacon.

FIG. 6 describes a preferred method by which access point tracking unit 134 updates the in-range access point information table 60 to reflect a newly received beacon (step 240 of FIG. 2).

FIG. 6 preferably includes the following steps:

STEP 430—The access point which was least recently updated is selected.

STEP 440—Determine if the time which has elapsed since that access point was updated falls below a predetermined threshold, STEP 450—If the decision of step 440 is negative, the access point in question is replaced by a "best" access point, according to the above-described definition of bestness or any other suitable definition of bestness.

STEP 460—The next frequency for the access point is computed. The method for performing step 460 may be similar to the above-described method for performing step 370.

STEP 470—The station listens for a beacon at the ambush frequency until a beacon is heard or up to a time limit such as the duration of 2 hops;

STEP 480—The beacon is checked to ensure that it has been received correctly and completely; and STEP 490—If the beacon has been received correctly and completely, the appropriate entry is updated to reflect the contents of the beacon.

If the beacon is found not to have been received correctly and completely,

STEP 500—If the number of bad beacons (i.e. beacons received incorrectly or incompletely or not received at all) since the last time step 490 was performed for the access point in question, exceeds a predetermined threshold $Bad_{max}$, then STEP 510—the quality of service is reset to its worst value. In the present embodiment, parameter QoS is set at 255 and step 490 is performed to update all other information in the access point table.

It is appreciated that decisions as to whether or not to activate background processes need not include steps 224, 244 and 234 or alternatively more decision steps may be provided than just steps 224, 244 and 234.

It is appreciated that the software components of the present invention may, if desired, be implemented in ROM (read-only memory) form. The software components may, generally, be implemented in hardware, if desired, using conventional techniques.

A preferred embodiment of the system of FIG. 1 is now described:

1. Definitions

The subject of roaming is involved with the network level management (bridging) and with the inner-cell control protocol (MAC).

In a wireless communication cell, the quality of service is dependent upon two orthogonal factors: the Radio environment, and The network temporal performance. In order to preserve performance of a data Session the station should be able to change its cell coordinator on the one hand, and the link to the wired network, on the other 2. Motivation and Objectives Roaming is one of the most crucial network self-adapting features that preserves performance, both of the network and of the end-station.

Roaming algorithms are implemented in the upper MAC layer protocols and should be transparent to the higher network layers. In the RDC wireless cell, the roaming process is indeed transparent as to the upper protocols, but the way it is implemented today the process is time-consuming in such a way that all higher network functions are timed-out resulting a re-connection cycles for the application levels of the different stations in the cell.

The concept of fast roaming should be connected to other high-network-functions such as intelligent roaming conditions, inter-cell load-balancing and transparency of higher protocols (such as IP) to the roaming process, i.e., network connectivity between The applications of the station and the other network entities.

The basic idea of fast-roaming is to give the wireless stations enough knowledge to locate the roamed-to AP frequency table-entry in a convergence period limited in two hops, when the roamed-to AP is the best "channel provider" for the searching station. While it is done in a sub time-out duration.

All needed information should be fused into the super-frame control packet, enabling the "searcher" station to aggregate the relevant information. Using the super-frame as the roaming information carrier involves no overhead on network traffic for the CCMA protocol, while its main advantage is being distributed ones every hop. The roaming information being broadcast into the air enabling the conjugation of the AP network information and the radio quality sensing in the same time-stamp.

Higher network applications carry different timeout periods for the connectivity status decision. In order to perform the roaming procedure in a way that stations preserve their longterm performance and the infrastructure of the wireless inter-cell network will be optimized (i.e., load balancing in cell scale) the roaming procedure should be shorter in time than the typical time-out connectivity status.

The roaming process duration is influenced by two parameters: the duration of the frequency search and then its synchronization, and the login process.

The duration of the frequency search is reduced by the mechanism of a complete pre-roaming knowledge, and it is reduced to 150 msec. And the login process duration is shortened dramatically (depended upon the cell traffic and the number active stations) by changing the CCMA protocol for channel reservations.

Thus, the roaming process duration (from the NCP start to the moment the first data packet is able to be transmitted into the air) should be less than 200 msec long. As the roaming process involves traffic pattern change in the all network, the roaming topology should take into consideration the network response to its execution on the station's level as well as on the cell one.

The basic assumption made in the following procedure philosophy is that the Kaiman buffer-equalization concept can be adaptable in the wireless data network case: if stations perform the best attempt considering their own needs only, the all network will be eventually optimized given some relaxation period, under the restriction that the different stations roaming attempts will not be semi-synchronized in time.

As mentioned above, when an inter-cell network population is able to perform fast-roaming, while the roaming criteria are based on an A.I. decision-tree the roaming process can be used as a tool for a Dynamic-Load-Balancing. Every wireless station in the network executes Kalman buffer-equalization algorithms for the selection of the optimal AP, as a result the network converges into a Steady-State (SS). This SS is the optimal multi-cell wireless network segmentation as to the dynamically changing channel-demand.

This type of load balancing is proved to defuse bottleneck problems on the one-hand, and optimize aggregated network performance.

3. Intelligent Pre-Roaming Procedure

Every wireless station keeps a multi-AP information table. This table includes the knowledge needed for the station to roam between APs preserving the objectives stated in section 2. The table information structure shell be as follows:

| AP ID | Table | My-frequency entry at last sampling | Quality of service | RSSI |
|---|---|---|---|---|
| y | n | 1–79 | 0–255 | −100~−20 |

The A.I. based pre-roaming procedure is running as a background process, and has two stages:

Table update

Roaming decision 3.1. Table Update

Knowledge_aggregation as to the surouding APs (as seen by the wireless station) is divided into two main states: the acquisition state and the tracking state. The acquisition state is performed during the initial login stage of the wireless station. This state is executed as follows:

When a station is in an idle mode (noting to transmit and not in a sleep mode), it will start sensing on a chosen frequency $f$ (see equation below), awaiting for a Super Frame. The Super Frame will include an additional field: Quality of Service (a byte value calculated by the AP, the value is a function of # of registered stations, # of active stations, # of EDBs transmitted in a pre-defined time bin).

This process is activated as follows:

the SW sets the HW to be in NC mode, sets it self on the right frequency:

$f_1 = (F\,\mathrm{div}\,N+1)\,\mathrm{div}\,2$ $f_{n+1} = f_n + (F\,\mathrm{div}\,N)$ when:

F is the number of frequencies

N is the number of the spanning frequencies

Then, wait on the current frequency for F+1

Wait on the defined frequency for F+1 frequency hops, and collect the APs information that are being distributed via the super-frame (beacon).

Then choose the best AP and synchronize on it.

After this AP acquisition stage, the station has a complete information as to the surrounding APs.

After the acquisition stage is done the station keeps updating the stored information cluster. This learning stage is called the Tracking stage.

The AP tracking stage is performed by the station periodically, following the described procedure:

Choose the AP with the oldest time-stamp, if the time-stamp is older then $\partial T_{old}$ (the maximal update age aloud) then lock on this AP frequency as specified in the NCP bellow.

Wait for correlation Ok from the HW,

Read from HW the first SF's word containing the frame-type and the met-ID. if the AP is on the station's list to continue, else return to the original AP.

Wait for the EOM interrupt, while reading the SF's data,

Wait for the EOP interrupt while reading the data again if (SF is Tx via two antennae), and get the CRC Ok.

Return to regular activity.

Update the Pre-Roaming table. The parameters are: Net-ID, frequency-entry and the QoS.

If on the other hand no AP was updated before $\partial T_{old}$, then choose the AP that in case of roaming it would be the target AP (see section 3.2), and execute the procedure presented above.

3.2. Roaming Decision

This product is a background process for the roaming decision from its both sides:

1. Should I (the station) roam ?
2. What AP should I (the station) roam to ?

The user applies a rule-base decision as to its quality of service from the net controller (the current AP). These rules are tested over the knowledge-base of the inter-AP table described above. The concept of quality of service is divided into two major categories:

1. The radio environment.
2. Channel capacity to station's channel demand ratio.

The major factors that play role in the decision process are:

1. The normalized number of MAC re-transmissions in a pre-defined time bin—for the radio environment (one have to realize that MAC level re-transmissions are caused by radio environment only as the MAC is transparent to application level re-transmissions and handles those packets as data).

For the purpose of the radio channel quality estimation, every station will compare its own re-transmission rate to that of the all cell. Thus, in addition to the self re-transmissions counter the station will collect the re-transmission rate parameter that is broadcasted by the AP in the ALLOC control frame.

The AP will transmit the re-transmission ratio in every ALLOC frame. The re-transmission parameter will be calculated via the following relation $$\frac{EDB_{TOT}}{EDB_{Good}};$$

the given ratio will be presented as a one byte field size (as the RDC MC protocol has a ckockout parameter enabling up to 5 re-transmissions before frame discard, the above presented ration will be numerically bounded in the range of 0–5).

Then the Station will calculate its radio channel quality by the following equation:

$$R = MAX(R_{My}, R_{cell});$$

When:

$R_{My}$ is the re-transmission rate as calculated by the station.

$R_{cell}$ is the re-transmission rate of the complete cell as calculated by the AP.

2. The typical delay for packets in the transmit buffer of the station—for the channel capacity estimation.

A partially adaptive threshold should be defined for the radio cancel quality. Each station sets its own RSSI threshold as follows:

$$RSSI_{TH} = Max(RSSI_O, RSSI_{STA})$$

When:

$RSSI_{TH}$—the RSSI level threshold of the pre-roaming station $RSSI_O$—the critical RSSI level (typical value −60 dBm)

$RSSI_{STA}$—the current RSSI level of the pre-roaming station

Every station collecm its own AP's pre-roaming information. Thus the pre-roaming station has the QoS parameter information then it uses it as an adaptive threshold of the cell network service performance.

When a station decided that it should roam it activated the decision based AP allocation algorithm to choose the best AP to roam to. This algorithm uses the information as to the RSSI level and the QoS parameter transmitted by the APs in the super-frame control frame. The selection algorithm is described as follows:

| Parameter State | Decision |
| --- | --- |
| $(R_o > R) \& (D \geq D_o)$ | $Sup((RSSI_{AP} > RSSI_{STA}) \& (QoS_{AP} > QoS_{MY}))$ |
| $(R_o < R) \& (D \leq D_o)$ | $Sup((RSSI_{AP} > RSSI_{STA}) \& (QoS_{AP} \geq QoS_{MY}))$ |
| $(R_o < R) \& (D > D_o)$ | $Sup((RSSI_{AP} > RSSI_{STA}) \& (QoS_{AP} > QoS_{MY}))$ |

When:

$R_O$—is the retransmission threshold $D_O$—is the packet delay threshold

R,D—the current re-transmission and packer delay thresholds, respectively $RSSI_{STA}$—the station's RSSI level $RSSI_{AP}$—the investigated AP RSSI level $QoS_{MY}$—my AP's QoS $QoS_{AP}$—the investigated AP QoS The system introduced a RSSI threshold level which the investigated APs should be above of. In turn the station generates a sub-set of the available APs from this point of view and chooses the AP with the lowest QoS parameter (0–255). When the value QoS=255 means that the AP is not available to accept new-comers (for the purposes of the back-propagation knowledge of the load balancing feature the roaming procedure should spontaneously support).

Basing on the assumption that every station will eventually converge on the based AP available to it, the load-balancing infrastructure characteristic would be preserved, when the back-propagation of the AP willingness as to its availability decreases the relaxation time to optimum positioning convergence.

The information aggregated by the bridges is: Number of registered stations, number of active stations and the number of EDBs transmitted in the last time bin (existing SNMP counter).

The bridges of the system aggregates the relevant information as to the calculation of the QoS parameter, and calculate it following the algebraic relation described:

$$QoS = \begin{cases} \frac{\partial QoS}{\partial t} < D_{QoS} \Rightarrow Min\left(\pi \cdot \left(U_A + \frac{U_R - U_A + 1}{4} \cdot \frac{EDB_{tot}}{EDB_{Ok}}\right), 255\right) \\ Else \Rightarrow 255 \end{cases}$$

Equation reasoning:

When a station is searching for the best AP, it "asks" the following question: What is the normalized channel fraction that I (a station) will get in the investigated AP?

When:

$U_A$—is the number of the active stations in the last time bin.

$U_R$—is the number of registered stations.

$EDB_{tot}$—number of the EDBs in the cell, including re-transmissions.

$EDB_{Ok}$—number of EDBs in the cell, which were send Ok (CRC Ok).

Thus, $U_R - U_A + 1$: the number of non-active stations in the investigated cell after one station more is registered.

¼: migration factor from the non-active stations to the active ones.

$$\frac{U_R - U_A + 1}{4}:$$

a rough prediction to the future number of active stations.

$$\frac{EDB_{tot}}{EDB_{Ok}}:$$

overhead cell traffic ratio.

$$\left(\frac{U_R - U_A + 1}{4} \cdot \frac{EDB_{tot}}{EDB_{OK}}\right)^{-1}:$$

the ratio of the EDB number I (the station) will Tx/Rx in the investigated cell to the number of tho EDBs the investigated AP will support.

$$\frac{\partial QoS}{\partial t}:$$

the AP's state change, computed over the last 3 hops $D_{QoS}$: the critical threshold for the accept able state change Thus, the searching station will roam (if decided so) to the AP with the minimal QoS value.

3.3. The Mass-Migration Problem.

When a population of stations decide upon roaming execution in a distributed manner, there are situations which can lead to massive roaming at short time periods, such events are defined as a Mass-Migration process.

These chain events should be avoided in the presented roaming architecture. For this reason the distributed decisions performed by the stations are controlled via two mechanisms, the one is a semi-random periodicity schedule of the roaming system background processes, and the second is a feedback mechanism performed by the bridge and rising the QoS parameter.

As explained above, there are two background processes associated with the roaming procedure: the table-update, and the pre-roaming.

As pre-roaming process decides as to the station's own diagnostic status and choosing the best AP to roam-to, it is responsible for entering the actual New-Comer mode. In order to prevent the mass-migration event, this process should be activated in much slower periodicity than the table-update one, and should be carried out in an asynchronous manner (as to the rest of the stations in the network).

The presented arguments lead to the following processes periodicity:

3.3.1. Pre-Roaming periodicity

Install Stage let Param:=T.B.D.

let ϵ:=T.B.D.

let periodicity$_{my}$:=periodicity$_o$+(-1)$^{RAND((2)+1}$.(RAND(periodicity$_o$DIV2)+1)

In Pre-Roaming

When in pre roaming state, then calculate time$_{NextGap}$:=periodicity$_{my}$+(-1)$^{RAND(2)+1}$.(RAND(periodicity$_{my}$DIVparam)+1)

In idle, decide to enter the Pre-Roaming if ($|$time$_{sys}$-time$_{LastPerformed}$-time$_{NextGap}|\leq \epsilon$) and (after▷TableUpdate) then perform the pre-roaming decision process;

3.3.2. TableUpdate periodicity

The AP table update is divided into two separated learning stages:

New AP acquisition and, an AP multi-tracking

The Acquisition and tracking processes will be activated periodically using the following relation:

($C_{Hop}$ mod $N_L$)and(Idle$_{First}$), When:

$C_{Hop}$—Hop counter $N_L$—Number of hops between successive learning tasks

Idle$_{First}$—The first time the station is in idle mode, after a S/F detection In difference from the pre-roaming processes the AP table update, should occur simultaneously as possible—this way the system guaranties the same APs knowledge for all the stations plurality.

3.3.3. Bride Feedback mechanism

The bridge computes its state change $$\left(i.e. \frac{\partial QoS}{\partial t}\right)$$

and rises its QoS parameter to the maximum value. As stations roam to the minimal QoS AP (see above), this mechanism will stop the stations migration to the current AP.

4. New Comer Procedure

After the best AP is selected, the station calculates the AP's entry:

$$E_{cuff}=(F_{my}-F_{sample})\cdot T_{hop}$$

when:

$F_{my}$—Station's frequency at current time.

$E_{cuff}$—the current AP's frequency table entry.

$F_{sample}$—the frequency at which the investigated AP was sampled.

$T_{hop}$—hop time period.

Then, the station locates it self on the calculated frequency table entry waits for a given time-out duration for the AP's super-frame, synchronizes with it, and start the current RDC login procedure.

If the waiting period is expired, then the station tries first to re-establish its old AP connection (in the non-catastrophic cases) and starts the all procedure of the pre-roaming ones again.

While in the catastrophic mode, the station will select the next-best AP and execute the new-comer procedure repeatedly.

5. The Login Process

The current login-process is based upon the station sending a login-RTS after detecting a CCLR, and competing in the Slotted-ALOHA mechanism along with the test of the network that mainly uses this mechanism for data transmission requests. In turn, all the "successful" RTSs are scheduled in a service buffer. The CCLR events become more rare as this buffer gets longer (the Round-Robin machine). Thus, for a new-comer it takes more time to be allocated and in turn it might take a long (seconds) periods of time for this station to start transmitting data. Consequently, the fast-roaming is not reached.

The HW will introduce the SW a 16 possible slots for the CCLR mechanism (rather then the 8 slots that are used today). The SW will use the first 8 of them for the data-RTS frames (same as in SW ver. 5.0), and the last 8 for the login-RTS frames. The two slot groups are to be given different randomization number for the slot draw probability.

The SW will handle two RTS-buffers, one for the data transmission requests (the current RTS-buffer), and the second for the login requests. The login requests buffer will be treated first and only when this queue is nulled (no more new-comer requests are registered for service) the RTS-buffer starts to be served. The login process itself is not to be changed.

As to CCLR frequency, while there exists a non-empty login queue, the CCLR shall be activated at a Round-Robin mechanism for this buffer, and when it becomes an empty queue the CCLR frequency shall be decreased rapidly to its lowest value.

The frequency could be dropped to min. at one step, as the new-comers are using different slot groups and the login requests are nulled, but for the purpose of back compatibility, the "old" stations will still use the previous slot configuration as well as buffers—the data slots and the login slots are coupled, thus new-comers are treated via the RTS-buffer.

6. Functionality

The PorTtLan system is constructed of three characteristic building blocks:

1. The bridge, which is responsible for the bridging functions and the statistics parameter collection.
2. The AP, which coordinates and controls the MAC layer and the wireless cell.
3. And the user station.

The proposed fast-roaming procedures will influence the system blocks by the following functional descriptions:

| Remote Station | AP-MAC coordinator | Bridge |
| --- | --- | --- |
| Load Super-Frame | Read QoS form Shared-memory | Collect Parameters |
| Handle Table Background-1: Measure AP's parameters Background-2: Pre-Roaming Decision New-Comer Procedure | Construct Super-Frame | Calculate QoS Write Qos to Shared-memory |

It is appreciated that the particular embodiment described above and in the Appendix is intended only to provide an extremely detailed disclosure of the present invention and is not intended to be limiting.

The invention shown and described herein has a wide variety of applications including but not limited to:

a. Mobile communication applications such as cellular telephones; CDPD applications; mobile data networks; mobile voice networks; property mobile detection; computer telephone integration (CTI) applications; mobile WANS (wide area networks such as ISDNs, BISDNs, frame relay, ATM, etc.); mobile MANs (metropolitan area networks such as ISDN, frame relay, ATM, ISP applications, etc.); and mobile LANs (local area networks such as wireless LANs, temporary networks, mobile point-to-point/point-to-multi point bridging/routing, etc.).

b. Information switching applications such as electrical power lines connectivity applications, network switching and load balancing in electrical power stations, UPS unit balance activation, and wireless local loops.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

APPENDIX A

```
/***************************************************************/
/***************************************************************/
// Follow are assumption on the hosting system
// These can be supplied by either Hardware or Software // registers
define BEACON_ADDR_REGISTER        0x20000
        // Reg. used to store the addr. of beacon data
#define RSSI_REGISTER               0x20678
        // Reg. used to store the radio quality in which the last frame Received.

// routines
extern SetHopIntHandler (void *func(void));
        // Set a function to be called whenever Hop starts extern SetBeaconIntHandler (void *func(void));
        // Set a function to be called whenever a Beacon Received extern LoadFreqForRx (dword freq);
        // Load a radio frequency and set radio for Rx.

extern ResetToRoutineMode();
        // Do all necessary processing inorder to go to routine processing // Also assumed are a group of table handling, which can be implemented
// in any standart table handling.

void APInfoTableInit ();                                    // Table Initialization
void APInfoTableUpdate (APInfoTableEntry);  // Entry Update
APInfoTableEntry *APInfoTableGetBest();         // Get the best AP
APInfoTableEntry *APInfoTableGetOldest();      // Get the least updated AP
APInfoTableEntry *APInfoTableLocate (byte id);              // get AP entry by its ID /***************************************************************/
/***************************************************************/

// constant samples for parameters used in system
#define NO_OF_NC_AMBUSH_FREQ            6
#define NO_OF_ENTRIES_IN_FREQ_TABLE 80
#define BOP_SHORT_PERIOD                4
#define BOP_LONG_PERIOD                 BOP_SHORT_PERIOD * 10
#define LEARNING_MODE_WAIT_HOPS         2
#define MAX_BAD_TRACKING_BEACONS    5
define QOS_WORST                       0xFF // how to calculate the age of an entry in hops
define AGE(timeStamp, hopsCounter)\
        (timeStamp - hopsCounter MOD NO_OF_ENTRIES_IN_FREQ_TABLE)

// Values for ApLearnMode
#define AP_TABLE_NO_LEARN       0
#define AP_TABLE_INIT           1
#define AP_TABLE_TRACKING       2
#define AP_TABLE_ACQISITION     3
#define AP_TABLE_WAIT_SYNC      4

// A structure of one entry in the APInfoTable
typedef struct {
```

```
        byte    id;                  // AP ID
        dword   RSSI;                // RSSI
        byte    QoS;                 // Quality of Service
        word    ApEntry;  // Entry of AP in timestamp
        word    timeStamp;           // Time Stamp of last update
                                     // (entry in current Freq. Table)
        int             badBeacons;  // counter for bad beacons in tracking mode
} APInfoTableEntry;

// A beacon structure
typedef struct {
        byte                Type;    // type of message
        byte                ApID;    // AP ID
        byte                QoS;     // Quality of Service
        word                Entry;   // AP entry in its FreqTable.
                                     // when sending this beacon
} BEACON_MESSAGE;

// Global Variables in this code dword NC_Freq_Table [NO_OF_NC_AMBUSH_FREQ]; // The new comer ambush frequencies
int NC_Freq_Table_Index;    // Current Index in the above.

APInfoTableEntry *APInfoTable;       // The APInfoTable
int ApLearnMode;            // Current State of learning the APInfoTable // counters
int hopsCounter;                             // counter for hops inside Freq. Table
int GlobalHopsCounter;                       // global hops counter (always increases)
int learnHopsCounter;                        // count hops in APInfoTable learning stage
int WaitForSyncHopCounter = 0;    // count hops in wait for sync. stage.
int HopsSinceLastRoamDecision = 0;  // count hops since last roam decision // flags
bool FirstIdleAfterHop;

//
// Procedure to initialize the AP Info Table
//
void init ()
{
        ApLearnMode = AP_TABLE_INIT;
        hopsCounter = 0;
        GlobalHopsCounter = 0;
        BeaconFound = FALSE;

// set interrupt handlers
        SetHopIntHandler (HopInterruptHandler);
        SetBeaconIntHandler (BeaconInterruptHandler);

// Initialize APs Info table
        APInfoTableInit();

// define ambush frequencies
        // and fill the NC_Freq_Table
        DefNewComerAmbushFreq ();

// get first ambush frequency
```

```
            NC_Freq_Table_Index = 0;
            LoadFreqForRx (NC_Freq_Table [NC_Freq_Table_Index]);

// wait until learning process is done
            while (ApLearnMode != AP_TABLE_NO_LEARN);

// getting out of here with no success will activate this function again.
            return;
    }

//
// This function will be called each time a new hop starts
//
void interrupt HopInterruptHandler (void)
{
            APInfoTableEntry bestAp;

// reset parameters and update counters
            FirstIdleAfterHop = TRUE;
            hopsCounter += 1;
            GlobalHopsCounter += 1;

switch (ApLearnMode) { case AP_TABLE_NO_LEARN:
                            HopsSinceLastRoamDecision += 1;
                            return;

case AP_TABLE_ACQUISITION:
                    case AP_TABLE_TRACKING:

// here we are inside a learning process which is not in init
                            // we only process it for LEARNING_MODE_WAIT_HOPS (~2) hops
                            learnHopsCounter += 1;

if (learnHopsCounter > LEARNING_MODE_WAIT_HOPS)
                                    ApLearnMode = AP_TABLE_NO_LEARN;
                            return;

case AP_TABLE_WAIT_SYNC:

WaitForSyncHopCounter += 1;
                            if (WaitForSyncHopCounter > WAIT_FOR_SYNC_MAX_HOPS)
                                    ApLearnTable = AP_TABLE_NO_LEARN;
                            return;

case AP_TABLE_INIT:

// complete a whole cycle with this frequnecy
                            if (hopsCounter < NO_OF_ENTRIES_IN_FREQ_TABLE + 1)
                                    return;

// By now all APs in the area should have Tx in this Freq.
                            // If we didn't hear any AP, try next Ambush Freq.
                            // maybe AP's were not heard because of fading
                            if (! BeaconFound) {

NC_Freq_Table_Index += 1;

// We did not hear any AP at any of the NC ambush freq.
```

```
                                // restart new comer mode
                                if (NC_Freq_Table_Index == NO_OF_NC_AMBUSH_FREQ) {
                                        NC_Freq_Table_Index = 0;
                                        ApLearnTable = AP_TABLE_NO_LEARN;
                                        return;
                                }

// Try next ambush freq.
                                LoadFreqForRx (NC_Freq_Table [NC_Freq_Table_Index]);
                                return;
                        }

// Beacon was found in process, synchronize with best AP exists
                        SyncWithBestAP();
                }
                return;
        }

//
// This function is called whenever a beacon is received in the system
//
void interrupt BeaconInterruptHandler (void)
{
        bool beaconOK, validAP;
        APInfoTableEntry apInfo;
        BEACON_MESSAGE      *beacon;

// get the beacon
        beacon = *BEACON_ADDR_REGISTER;

// check beacon CRC and correlation
        beaconOK = IsBeaconOk ();

// check AP ID
        validAP = CheckApID (beacon.ApID);

// update AP info
        apInfo.id = beacon.ApID;
        apInfo.RSSI = *RSSI_REGISTER;
        apInfo.QoS = beacon.QoS;
        apInfo.ApEntry = beacon.Entry;
        apInfo.timeStamp = hopsCounter;

// A good beacon was found
        if (beaconOK AND validAP) {

APInfoTableUpdate (&apInfo);
                BeaconFound = TRUE;

// if we are in the process of waitting for sync.
                // learning process is done.
                // go back to routine work.
                if (ApLearnMode == AP_TABLE_WAIT_SYNC) {
                        ResetToRoutineMode();
                        ApLearnMode = AP_TABLE_NO_LEARN;
                }
        } else {
                // if all consecutive tracking of this AP gave BAD beacon
```

```
                // update it for the worst quality of service if (ApLearnMode == AP_TABLE_TRACKING) {
                        APInfoTableEntry *apEntry;

apEntry = APInfoTableLocate (apInfo.id);
                        if (ApEntry->BadBeacons > MAX_BAD_TRACKING_BEACONS) { apInfo.QoS = QOS_WORST;
                                apInfo.BadBeacons = 0;
                                APInfoTableUpdate (&apInfo);
                        }
                }
        }
        return;
}

//
// This function create the new comer ambush frequency table
//
void DefNewComerAmbushFreq ()
{
        int i;
        int jump;

jump = NO_OF_ENTRIES_IN_FREQ_TABLE / NO_OF_NC_AMBUSH_FREQ;
        NC_Freq_Table [0] = (jump + 1) / 2;

for (i = 1; i < NO_OF_NC_AMBUSH_FREQ; i++)
                NC_Freq_Table[i] = NC_Freq_Table [i-1] + jump;
        return;
}

//
// This function is used for selecting a best AP from the table
// and start the process of synchronization with it
// We will be sync. with this AP as soon as first beacon of this AP received
//
void SyncWithBestAP ()
{
        APInfoTableEntry *apInfo;
        word     lockInEntry;

// get the best access point in table
        apInfo = APInfoTableGetBest ();

lockInEntry = (apInfo.Entry + apInfo.timeStamp - hopsCounter)
                                MOD NO_OF_ENTRIES_IN_FREQ_TABLE + 1;

LoadFreqForRx (ApsFreqTable [apInfo.ID] [lockInEntry]);

WaitForSyncHopCounter = 0;
        ApLearnMode = AP_TABLE_WAIT_SYNC;
        return;
}

//
// This function will be called the routine process whenever
// the station is IDLE.
```

```
// i.e. no other processing is needed at this moment.
//
void BackGroundProcess (void)
{
        int longPrd, shortPrd, roamPrd;

// we want to allow only one background process in a hop
        if (! FirstIdleAfterHop)
                return;

FirstIdleAfterHop = FALSE;
        learnHopsCounter = 0;

// check acquisition periodicity
        if (GlobalHopsCounter MOD BGP_LONG_PERIOD == 0)
                ApAcquisitionProcess();

else
                // check roaming decision periodicity
                if (HopsSinceLastRoamDecision >= RoamDecisionPeriod)
                        RoamDecisionMaker();

else
                        // check tracking periodicity
                        if (GlobalHopsCounter MOD BGP_SHORT_PERIOD == 0)
                                ApTrackProcess();

// wait until learning process is done
        while (ApLearnMode != AP_TABLE_NO_LEARN);
        return;
}

//
// This process is activated to keep the APInfoTable as updated as possible
//
void ApTrackProcess (void)
{
        word lockInEntry;
        APInfoTableEntry *apInfo;

// first check if exist an entry which was not updated for too long
        apInfo = APInfoTableGetOldest ();

// if it is recently updated
        if (AGE (apInfo->timeStamp, hopsCounter) <= MAX_TABLE_ENTRY_AGE)

// replace with the currently best access point in table
                apInfo = APInfoTableGetBest ();

// calculate the next freq. entry of that AP
        lockInEntry = (apInfo.Enrty + apInfo.timeStamp - hopsCounter)
                                MOD NO_OF_ENTRIES_IN_FREQ_TABLE + 1;

LoadFreqForRx (ApsFreqTable [apInfo.ID] [lockInEntry]);
        return;
}

//
// This process is activated in order to find new APs that are not
// yet in the APInfoTable.
```

```
// This is done by using the NC ambush frequencies.
//
void ApAcquisitionProcess (void)
{
        // get next newcomer ambush freq.
        NC_Freq_Table_Index += 1;

if (NC_Freq_Table_Index == NO_OF_NC_AMBUSH_FREQ)
                NC_Freq_Table_Index = 0;

// load it
        LoadFreqForRx (NC_Freq_Table [NC_Freq_Table_Index]);
        return;
}

//
// This process should check how a station is "feeling" relative
// or the quality of service it is getting.
// If it doesn't feel too good, it can try look for a better AP
//
void RoamDecisionMaker (void)
{
        APInfoTableEntry *apInfo;

// Do I feel OK?
        if ((ReTx0 > MyReTx        AND        MyDelay >= Delay0)       OR
            (ReTx0 < MyReTx        AND        MyDelay <= Delay0)       OR
            (ReTx0 > MyReTx        AND        MyDelay <= Delay0)) {

// Is this the best I can do right now?
                apInfo = APInfoTableGetBest();

if (apInfo.ID != MyID)

// it looks like I can do better
                        SyncWithBestAP();
        }
        return;
}
```

What is claimed is:

1. A network system comprising:
   a plurality of access points;
   a multiplicity of network stations wherein for each station, a ratio between available channel fraction and station channel demand is defined;
   and wherein each of said multiplicity of stations roams between said plurality of access points so as to equalize said ratios over at least a subset of said multiplicity of stations.

2. A system according to claim 1 wherein each of said multiplicity of stations comprises a wireless station including:
   a frequency table memory including a set of frequency tables each having an ID; and
   a table of information regarding said plurality of access points including at least some of the following information for each of at least some of said plurality of access points:
      access point's ID including the access point's frequency table ID and a time-stamped entry of the access point's frequency table;
      access point's quality of service, time-stamped; and
      access point's radio signal strength intensity (RSSI) Level, time-stamped.

3. A system according to claim 2 wherein each wireless station includes an access point learner which is operative to maintain said table of information.

4. A system according to claim 3 wherein said access point learner operates in background.

5. A system according to claim 2 wherein each of said access points includes a quality of service computation unit operative to compute and broadcast the access point's quality of service.

6. A system according to claim 2 and wherein each station also comprises a roam-decision maker which decides whether or not to roam based on the quality of the station's radio environment and on extent of access of the station to a channel.

7. A system according to claim 6 wherein said environment quality is based at least partly on the proportion of messages which required retransmission in a sliding time window of predetermined size.

8. A system according to claim 6 wherein said channel access extent is based at least partly on packet delay information.

9. A system according to claim 6 wherein said roam-decision maker makes a decision whether or not to roam at least partly on the basis of the RSSI levels and qualities of service received from access points as stored in the table of information within its station.

10. A system according to claim 1 and also comprising an access point selector operative to select an access point to which to roam.

11. A network roaming method comprising:
    defining, for each of a multiplicity of network stations a ratio between available channel fraction and station channel demand; and
    causing each of said multiplicity of stations to roam between a plurality of access points so as to equalize said ratios over at least a subset of said multiplicity of stations.

* * * * *